US010837828B2

(12) United States Patent
Lehman et al.

(10) Patent No.: US 10,837,828 B2
(45) Date of Patent: Nov. 17, 2020

(54) NON-ATTENUATING METER FOR DETERMINING OPTICAL ENERGY OF LASER LIGHT

(71) Applicant: Government of the United States of America, as represented by the Secretary of Commerce, Gaithersburg, MD (US)

(72) Inventors: John H. Lehman, Boulder, CO (US); Matthew T. Spidell, Westminster, CO (US); Joshua A. Hadler, Lyons, CO (US); Paul A. Williams, Erie, CO (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 0 days.

(21) Appl. No.: 16/520,643

(22) Filed: Jul. 24, 2019

(65) Prior Publication Data
US 2020/0072666 A1     Mar. 5, 2020

Related U.S. Application Data

(60) Provisional application No. 62/727,250, filed on Sep. 5, 2018.

(51) Int. Cl.
*G01J 1/56*     (2006.01)
*G01J 1/04*     (2006.01)

(52) U.S. Cl.
CPC ............... *G01J 1/56* (2013.01); *G01J 1/0414* (2013.01)

(58) Field of Classification Search
CPC ........... G01J 1/56; G01J 1/0414; G01J 1/4257
See application file for complete search history.

(56) References Cited

U.S. PATENT DOCUMENTS

| 4,260,255 A * | 4/1981 | Wachs | G01J 1/4257 356/222 |
|---|---|---|---|
| 4,916,319 A * | 4/1990 | Telfair | G01J 1/4257 250/365 |

(Continued)

OTHER PUBLICATIONS

Williams, P., et al., "Portable, high-accuracy, non-absorbing laser power measurement at kilowatt levels by means of radiation pressure", Optics Express, 2017, p. 4382-4392, vol. 25 No. 4.

(Continued)

*Primary Examiner* — Sang H Nguyen
(74) *Attorney, Agent, or Firm* — Office of Chief Counsel for National Institute of Standards and Technology

(57) ABSTRACT

A non-attenuating meter determines optical energy of laser light in an absence of optical attenuation of the laser light and includes: a recipient mirror that: receives laser light that propagates in a primary propagation direction; produces profile light; transmits the profile light through the recipient mirror along the primary propagation direction; produces first reflected light from the laser light; and reflects the first reflected light along a secondary propagation direction; a profilometer in optical communication with the recipient mirror and that: receives the profile light from the recipient mirror along the primary propagation direction; and produces a profile signal from the profile light; a sensor mirror in optical communication with the recipient mirror and a passer mirror and that: receives the first reflected light from the recipient mirror along the secondary propagation direction; produces, in a tertiary direction, a sensor force from the first reflected light; communicates the sensor force to a force sensor along the tertiary direction; produces a second reflected light from the first reflected light; and reflects the second reflected light in a tertiary propagation direction; the passer mirror in optical communication with the sensor mirror and that: receives, along the tertiary propagation (Continued)

direction, the second reflected light from the sensor mirror; produces pass light from the second reflected light; and reflects the pass light along the primary propagation direction, such that the non-attenuating meter does not attenuate the optical energy of the laser light and does not change the primary propagation direction of the laser light.

12 Claims, 15 Drawing Sheets

(56) References Cited

U.S. PATENT DOCUMENTS

| | | | | |
|---|---|---|---|---|
| 6,497,701 | B2* | 12/2002 | Shimmick | A61F 9/008 606/5 |
| 7,190,465 | B2* | 3/2007 | Froehlich | G01C 15/002 356/601 |
| 8,797,552 | B2* | 8/2014 | Suzuki | G01B 11/2518 356/612 |
| 9,625,313 | B2 | 4/2017 | Lehman et al. | |
| 10,139,272 | B2 | 11/2018 | Bae | |
| 2004/0130707 | A1* | 7/2004 | Johnston | G01S 3/789 356/138 |
| 2004/0169850 | A1* | 9/2004 | Meeks | G01B 11/303 356/237.2 |
| 2005/0139542 | A1* | 6/2005 | Dickensheets | B81B 3/007 210/490 |
| 2005/0263760 | A1* | 12/2005 | Langer | H01L 22/34 257/48 |
| 2006/0206104 | A1* | 9/2006 | Chayet | A61F 9/00804 606/10 |

OTHER PUBLICATIONS

Aegis Technologies, "Directed Energy Targets and Instrumentation", URL: https://aegistg.com/directed-energy-sensors, accessed Jul. 23, 2019.

SemQuest, Inc., "Military Targets", URL: http://www.semquest.com/military-targets/, accessed Jul. 23, 2019.

* cited by examiner (A) <u>264.6</u>

(B) <u>264.6</u>

NON-ATTENUATING METER FOR DETERMINING OPTICAL ENERGY OF LASER LIGHT

CROSS REFERENCE TO RELATED APPLICATIONS

The application claims priority to U.S. Provisional Patent Application Ser. No. 62/727,250 filed Sep. 5, 2018, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 301-975-2573; email tpo@nist.gov.

BRIEF DESCRIPTION

Disclosed is a non-attenuating meter for determining optical energy of laser light in an absence of optical attenuation of the laser light by the non-attenuating meter, the non-attenuating meter comprising: a recipient mirror that: receives the laser light that is propagating in a primary propagation direction; produces profile light from the laser light; transmits the profile light through the recipient mirror along the primary propagation direction; produces first reflected light from the laser light; and reflects the first reflected light along a secondary propagation direction; a profilometer in optical communication with the recipient mirror and that: receives the profile light from the recipient mirror along the primary propagation direction; and produces a profile signal from the profile light; a sensor mirror in optical communication with the recipient mirror and a passer mirror and that: receives the first reflected light from the recipient mirror along the secondary propagation direction; produces, in a tertiary direction, a sensor force from the first reflected light; communicates the sensor force to a force sensor along the tertiary direction; produces a second reflected light from the first reflected light; and reflects the second reflected light in a tertiary propagation direction; the passer mirror in optical communication with the sensor mirror and that: receives, along the tertiary propagation direction, the second reflected light from the sensor mirror; produces pass light from the second reflected light; and reflects the pass light along the primary propagation direction, such that the non-attenuating meter does not attenuate the optical energy of the laser light and does not change the primary propagation direction of the laser light.

Disclosed is a process for determining optical energy of laser light with a non-attenuating meter in an absence of optical attenuation of the laser light by the non-attenuating meter, the process comprising: propagating a laser light along a primary propagation direction; receiving the laser light by a recipient mirror along the primary propagation direction; producing, by the recipient mirror, a first reflected light from the laser light; communicating the first reflected light from the recipient mirror along a secondary propagation direction; receiving, by a sensor mirror, the first reflected light from the recipient mirror; producing, by the sensor mirror, a sensor force and a second reflected light; communicating, from the sensor mirror, the sensor force along a tertiary direction; receiving, by a force sensor, the sensor force from the sensor mirror; communicating, from the sensor mirror, the second reflected light along a tertiary propagation direction; receiving, by a passer mirror, the second reflected light from the sensor mirror; producing, by the passer mirror, a pass light; communicating, from the passer mirror, the pass light along the primary propagation direction; and producing, from the sensor force, a force signal to determining the optical energy of the laser light.

BRIEF DESCRIPTION OF THE DRAWINGS

The following description should not be considered limiting in any way. With reference to the accompanying drawings, like elements are numbered alike.

DETAILED DESCRIPTION

Figure 1:
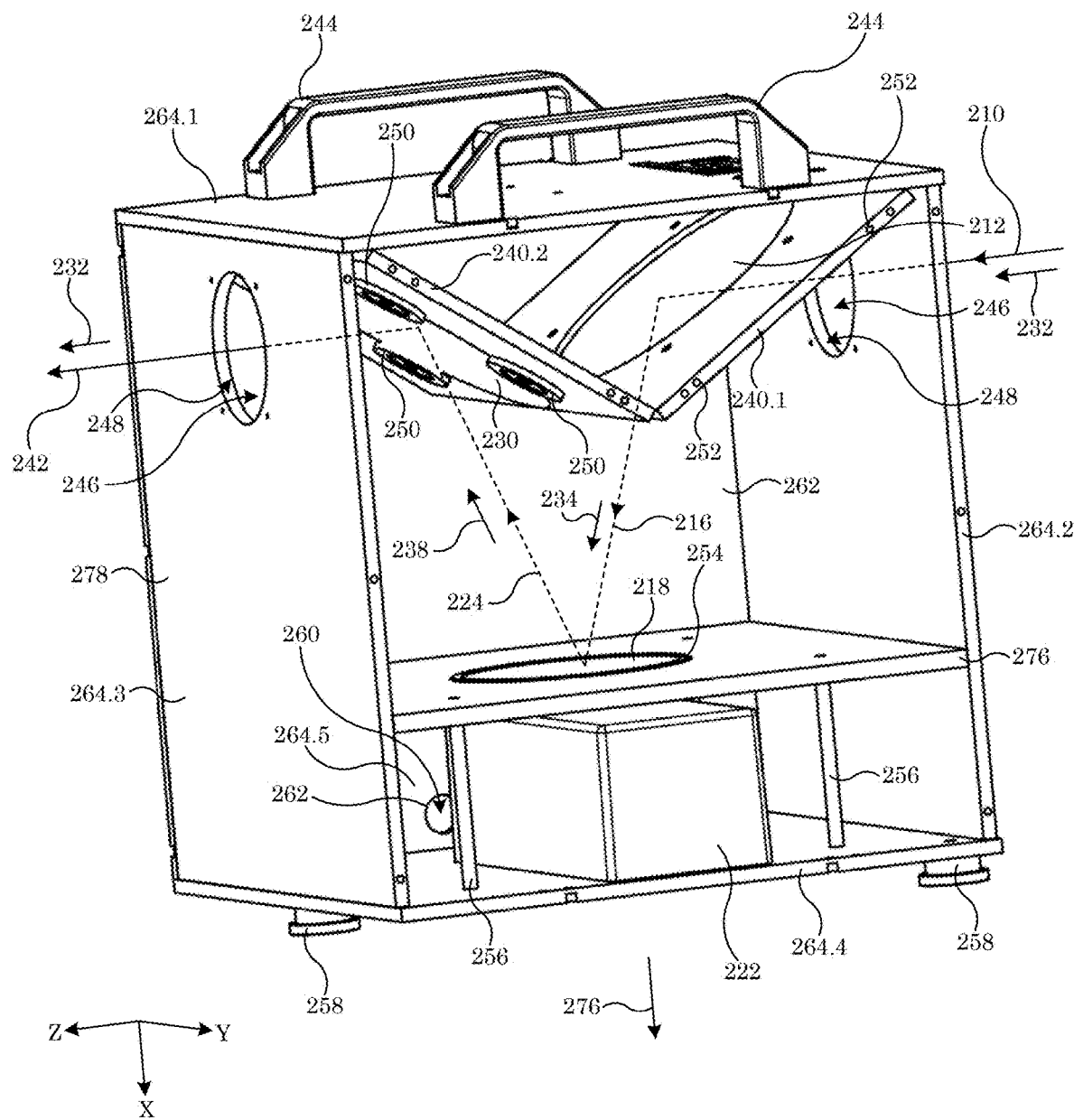
FIG. 1 shows a perspective view of a non-attenuating meter.
Figure 2:
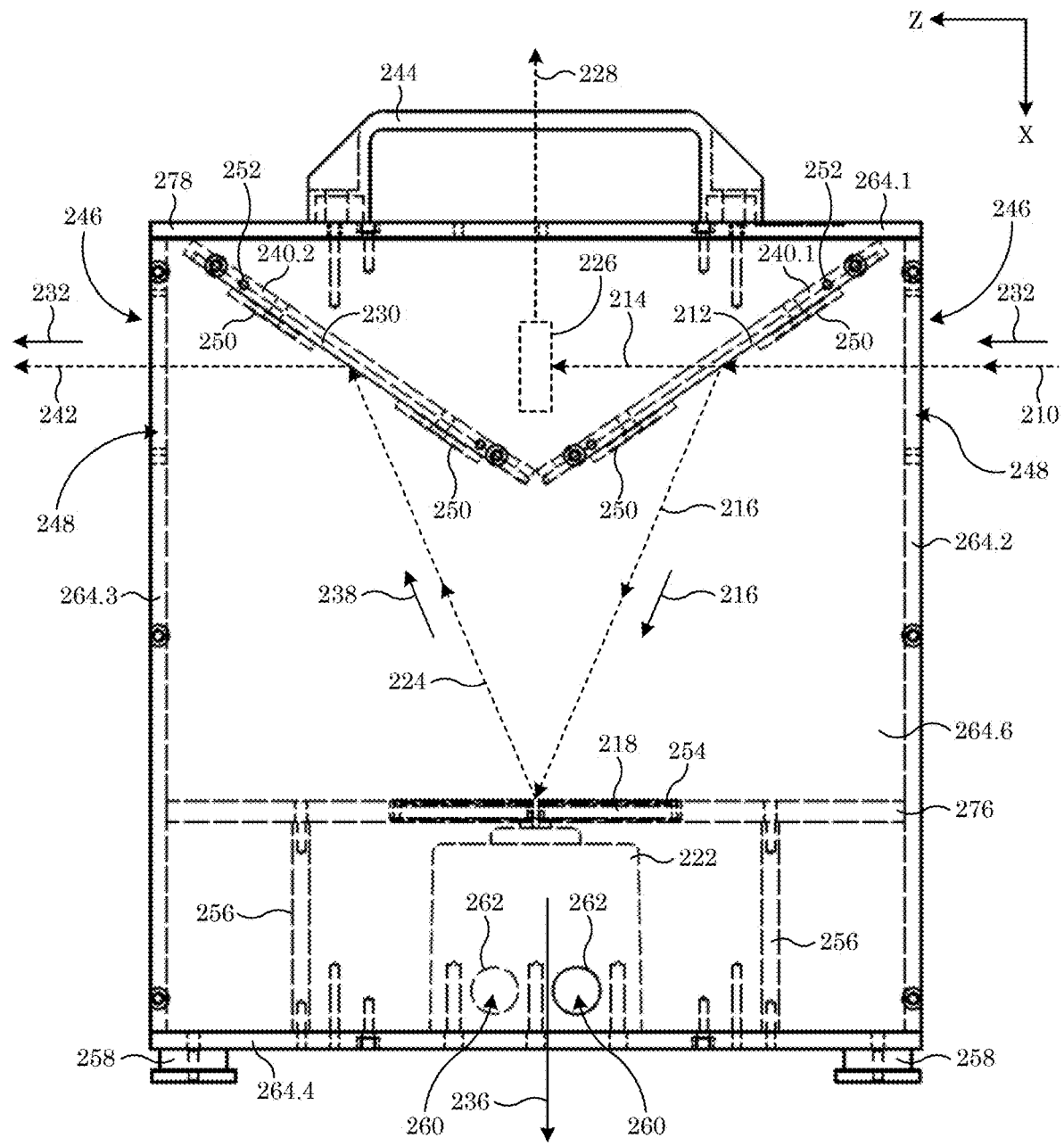
FIG. 2 shows a side view of the non-attenuating meter shown in FIG. 1.

A detailed description of one or more embodiments is presented herein by way of exemplification and not limitation.

It has been discovered that a non-attenuating meter described herein provides full and accurate characterization of laser light without attenuating the laser light or perturbing a direction of propagation of the laser light. The non-attenuating meter includes a plurality of mirrors to measure an absolute power through determination of radiation pressure from force on a mirror while a negligibly small portion of light that transmits through other mirrors can be measured to provide laser light properties such as a transverse profile, temporal response, spectral signature, and the like of the laser light. Advantageously, the non-attenuating meter also produces pass light from the laser light that propagates along the direction of propagation of the laser light.

In an embodiment, with reference to FIG. 1, FIG. 2, FIG. 3, FIG. 4, and FIG. 5, non-attenuating meter 200 determines optical energy of laser light 210 in an absence of optical attenuation of laser light 210 by non-attenuating meter 200 and includes recipient mirror 212 that receives laser light 210 that is propagating in primary propagation direction 232; produces profile light 214 from laser light 210; transmits profile light 214 through recipient mirror 212 along primary propagation direction 232; produces first reflected light 216 from laser light 210; and reflects first reflected light 216 along secondary propagation direction 234. Profilometer 226 is in optical communication with recipient mirror 212, and receives profile light 214 from recipient mirror 212 along primary propagation direction 232 and produces profile signal 228 from profile light 214. Sensor mirror 218 is in optical communication with recipient mirror 212 and passer mirror 230, receives first reflected light 216 from recipient mirror 212 along secondary propagation direction 234; produces, in tertiary direction 236, sensor force 220 from first reflected light 216; communicates sensor force 220 to force sensor 222 along tertiary direction 236; produces second reflected light 224 from first reflected light 216; and reflects second reflected light 224 in tertiary propagation direction 238. Passer mirror 230 is in optical communication with sensor mirror 218, receives, along tertiary propagation direction 238, second reflected light 224 from sensor mirror 218; produces pass light 242 from second reflected light 224; and reflects pass light 242 along primary propagation direction 232. Non-attenuating meter 200 does not attenuate the optical energy of laser light 210 and does not change primary propagation direction 232 of laser light 210.

In non-attenuating meter 200, recipient mirror 212, sensor mirror 218, and passer mirror 230 independently can include a mirror coating that includes of alternating layers of dielectric material, metal, metal with an overlayer of dielectric material, thin film of metal and dielectric, thin film of metal or dielectric, a patterned combination of metal and dielectric (metamaterial), or the like. The coating can be deposited on a substrate having an optical polish thereon that includes a material having a selected index to provide a selected reflectance at the angle of incidence defined by A1 or A2 to provide, e.g., maximize, a specular reflection so that light has negligible absorption and minimal transmittance on the mirror. Dielectric layers can be disposed on fused silica. In an embodiment, dielectric layers are on silicon, a metal layer and dielectric on silicon or fused silica, silicon carbide, quartz, and the like. Exemplary mirrors (212, 218, 230) include a stack of alternating quarter-wave thick layers of high and low index oxides selected to reflect light (e.g., 1070 nm) with a reflectivity of 99.998% for s-polarized light and 99.995% for p-polarized light at a selected angle, e.g., 22 degrees. The coating can have a laser induced damage threshold that is greater than 1 $MW/cm^2$ or an absorption of less than 1 ppm at this wavelength. Moreover, the element that includes the mirror and substrate can have a combination of thermal and optical properties to withstand an irradiance, e.g., of 10 $kW/cm^2$. A thickness of mirrors (212, 218, 230) can be from 100 µm to 10 mm, specifically from 1 mm to 5 mm, and more specifically from 2.9 mm to 3.1 mm. A transmission of mirrors (212, 218, 230) can be from 0.99 to 1, specifically from 0.999 to 0.9999, and more specifically from 0.9999 to 0.99999 at a wavelength from 400 nm to 11 µm, specifically from 1050 nm to 1100 nm, and more specifically from 1069 nm to 1070 nm, and such can be centered or optimized for a laser wavelength that can be e.g., 1064 nm (YAG), 1070 nm (Er:fiber), 10.6 µm ($CO_2$), and the like. A coefficient of thermal expansion (CTE) of mirrors (212, 218, 230) can be selected to match the CTE of the substrate and the mirror coating. The CTE of the mirror can be changed by double-sided coating the mirror substrate so that the mirror does not warp or bow.

Recipient mirror 210 receives laser light 210 from which light (214, 216, 224, 242) is produced. A power of light (210, 214, 216, 224, 242) independently can be from 1 mW to 200 kW, and specifically from 10 W to 50 kW at a wavelength from 250 nm to 1 mm, specifically from 1060 nm to 1080 nm, and more specifically 10 µm to 11 µm. Power can refer to the photons per second at a specified wavelength, more commonly in terms of Watts of light 222. A duty cycle of light (210, 214, 216, 224, 242) independently can be from continuous to 50:50. A frequency of light (210, 214, 216, 224, 242) independently can be from 1 kHz to continuous. An intensity of light (210, 214, 216, 224, 242) independently can be from 1 $W/cm^2$ to 100 $kW/cm^2$. Intensity can refer to irradiance in terms of Watts per area, typically expressed in $cm^2$.

Laser light 210 can be provided by a light source such as a laser. The laser can include external optics collimate and can be mounted to interface (248, 246). Exemplary lasers include Nd:YAG (neodymium-doped yttrium aluminum garnet), erbium fiber, carbon dioxide gas, and the like. In an embodiment, the laser includes a diode-pumped erbium fiber laser coupled to a collimator having an aperture smaller than (248) and mounted in proximity or fixed to (264).

Profilometer 226 can be in optically communication with recipient mirror 212 and optically interposed between recipient mirror 212 and passer mirror 230 to receive profile light 214 transmitted through recipient mirror 212. Profilometer 226 can include a light sensor to acquire a temporally and spatially resolved electric signal that maps the laser beam power as a function of position within the beam diameter and can be a linear or two-dimensional array of photodiodes or thermal detectors. Exemplary profilometers 226 include an array of photosensitive or thermally sensitive detector elements disposed behind mirror 212 to provide concurrent beam profilometry. A linear array of sensor elements may be tiled together to produce a selected aperture coverage. Arrays can be disposed behind first mirror 212 and third mirror 230 to yield a cross section of the X-axis and Y-axis of the beam. Beam profile data is combined with power measurement to provide a calibrated, time-resolved, intensity profile or irradiance. Moreover, profilometer 226 can include photodiode array controllers, data acquisition, USB or other interface (e.g., GPIB, RS232, and the like), software drivers, control interface, data recording, graphical user interface of beam profile, and the like to access electrical signals from the arrays sensors (thermal or photodiode), modify the sensor gain, acquire data, analyze data, display the beam power as a function of position with respect to 248. A size (e.g., a longest linear dimension) of profilometer 226 can be from 1 µm (single pixel) to 75 mm (multiple pixels), specifically from 1 µm to width of aperture defined by 248. A resolution of profilometer 226 can be from 250 µm to 1 mm. In an embodiment, profilometer 226 includes linear array sensor elements that are tiled together to produce aperture-wide end-to-end tiling with a pixel pitch as low as, e.g., 0.4 mm. This yields a 1-D cross section of the beam profile. In a mosaic format, the vertical spacing of such arrays can be, e.g., 1 cm. More specifically, a 50 mm linear array can have a 0.8 mm pixel-pitch (64 pixels). A dynamic range can be 1000:1 and expanded to a greater range digitally. The frame rate can be, e.g., about 4 Hz, and the array can be expanded to accommodate a selected beam diameter.

Profilometer 226 produces profile signal 228 from profile light 214. Profile signal 228 can include a singular sensor in the plane of aperture 248 indicating the power with respect to position, a plurality of sensors in the plane of aperture 248 indicating the power with respect to position or a linear array of sensor in the plane of aperture 248 indicating the power with respect to position, a two-dimensional array in the plane of aperture 248 indicating the power with respect to position. Exemplary profile signal 228 includes a graphical plot indicating on a vertical axis the beam power as a function of position on the horizontal axis, multiple graphical plots representing the beam power as a function of position on multiple lines in the plane of the aperture 248, and the like.

Sensor mirror 218 receives first reflected light 216 from recipient mirror 212 and produces sensor force 220. Sensor force 220 can include an electric force or a mechanical force. It is contemplated that an electrical current produced in response to sensor force 220 is proportional to the imparted photon force. The mechanical force involves a mechanical stiffness that is proportional to the imparted photon force. The mechanical force can have a displacement of sensor mirror 218 that is proportional to the photon force and can produced by an electromagnet in communication with sensor mirror 218, galvanometer, mechanical spring, cantilever, pendulum, and the like. A weighing capacity can be, e.g., 110 g with a minimum weighing value, e.g., of 0.00001 g, readability 0.00001 g, or response settling time 1 second or faster. It is contemplated that 1 kW can be the equivalent of approximately 670 µg mass. With respect to an optical detector, a noise equivalent power (inverse detectivity) of this element is an amount of optical power necessary to achieve a signal-to-noise ratio of one per signal bandwidth. An exemplary sensor here can have a noise equivalent less than 1 W/Hz$^{1/2}$.

Figure 13:
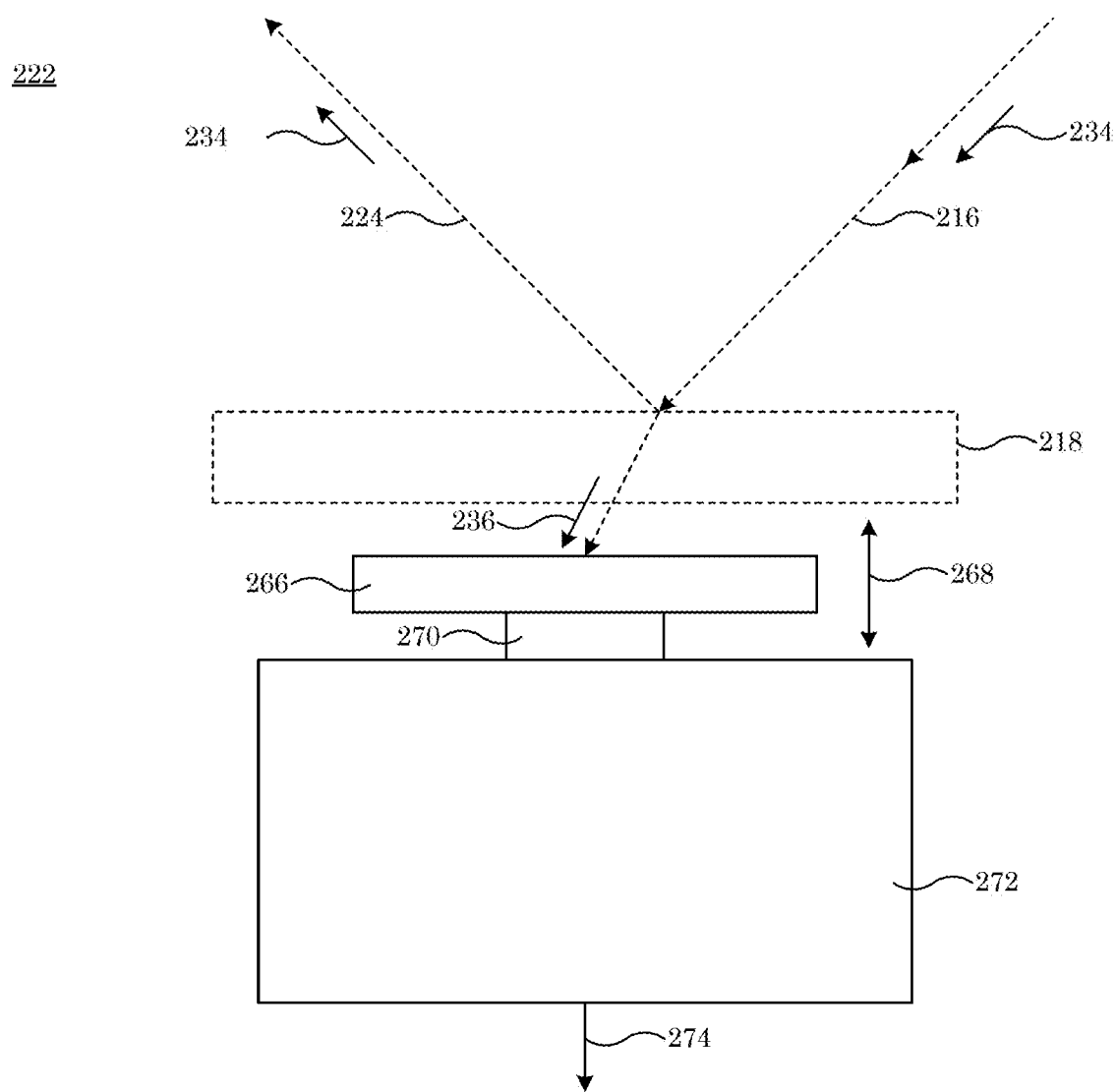
FIG. 13 shows a force sensor.

In an embodiment, with reference to FIG. 13, force sensor 222 is in optical communication with sensor mirror 218, receives sensor force 220 from sensor mirror 218; and determines optical energy from sensor force 220. Force sensor 222 includes light pan 266 in optical communication with sensor mirror 218 and that receives sensor force 220 from sensor mirror 218; force transfer member 270 in mechanical communication with the light pan 266; and force electronics 272 in electrical communication with force transfer member 270 and that produces force signal 274 based on sensor force 220 that moves light pan 266 along reciprocation direction 268. Light pan 266 can include a post, a rod, a tray, a pan, or a mechanism by which the mirror is held by its perimeter without obscuring the mirror surface or adding strain to the mirror substrate so that the mirror remains centered (center of mass) and rests over the force sensor. Light pan 266 can be a rigid connection between the force sensor on the mirror (the mirror simply resting on the force sensor), a tray attached to the force sensor in which rests the mirror, a mirror mount to grasp the mirror by its perimeter and transfer the photon force to the force sensor by a rod. Force transfer member 270 can include a rod, or a mechanical fastener (e.g., a bolt or screw), or the transfer member can be a monolithic part of the force sensor to rigidly transfer the photon force to the force sensor. Force electronics 272 can include a transducer to convert electrical current to force and can be a solenoid, magnet, capacitor, and the like. Exemplary force sensor 222 include a current-driven magnet. In an embodiment, force sensor 222 can be a weighing scale with 1 µg readability.

With reference to FIG. 1, FIG. 2, FIG. 3, FIG. 4, FIG. 5, FIG. 6, FIG. 7, FIG. 8, FIG. 9, FIG. 10, FIG. 11, and FIG. 12, non-attenuating meter 200 includes housing 278 in which recipient mirror 212, sensor mirror 218, and passer mirror 230 are disposed. Housing 278 can include bottom housing panel 264.4; light entry housing panel 264.2 disposed on bottom housing panel 264.4; light exit housing panel 264.3 disposed on bottom housing panel 264.4 and opposing light entry housing panel 264.2; back housing panel 264.5 disposed on bottom housing panel 264.4; front housing panel 264.6 disposed on bottom housing panel 264.4; and top housing panel 264.1 disposed on housing panels (264.2, 264.3, 264.4, 264.5, 264.6).

Figure 3:
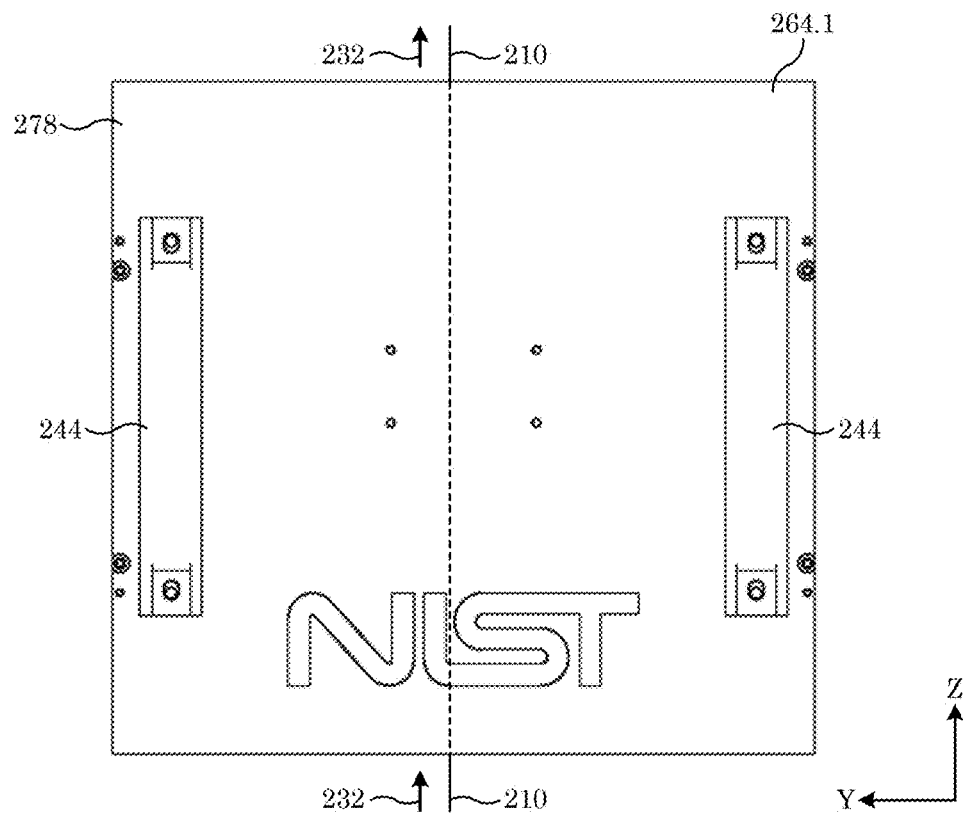
FIG. 3 shows, in panel A, a plan view of the non-attenuating meter shown in FIG. 1 and an entry end view in panel B.
Figure 3:
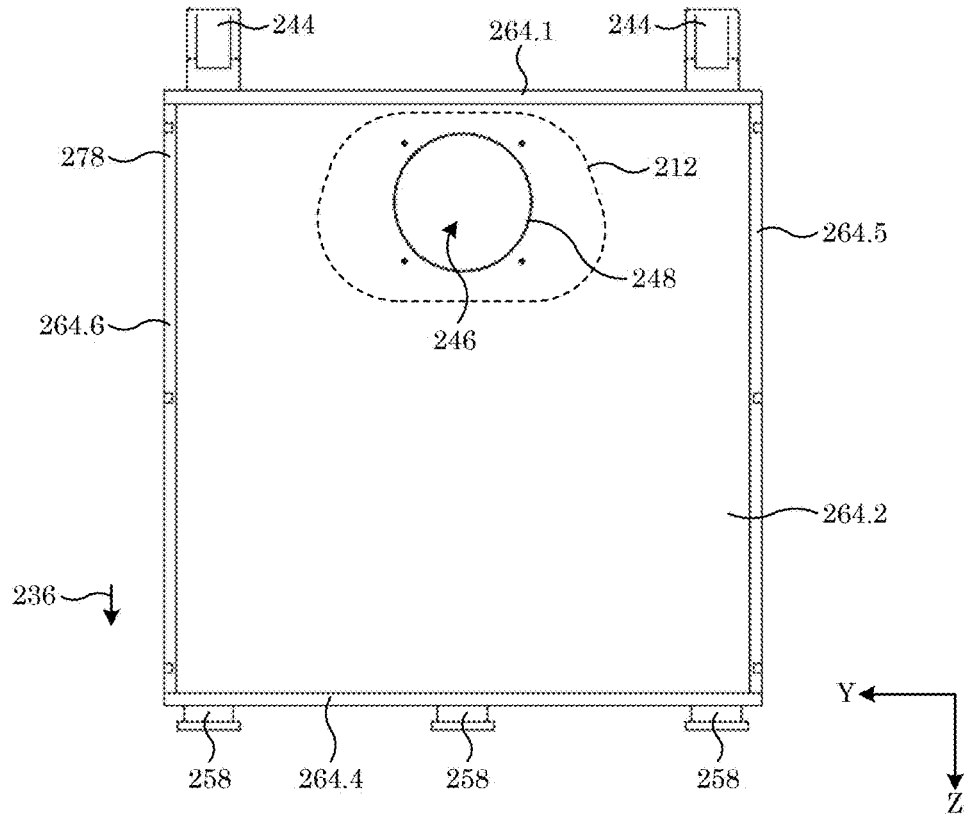
Figure 4:
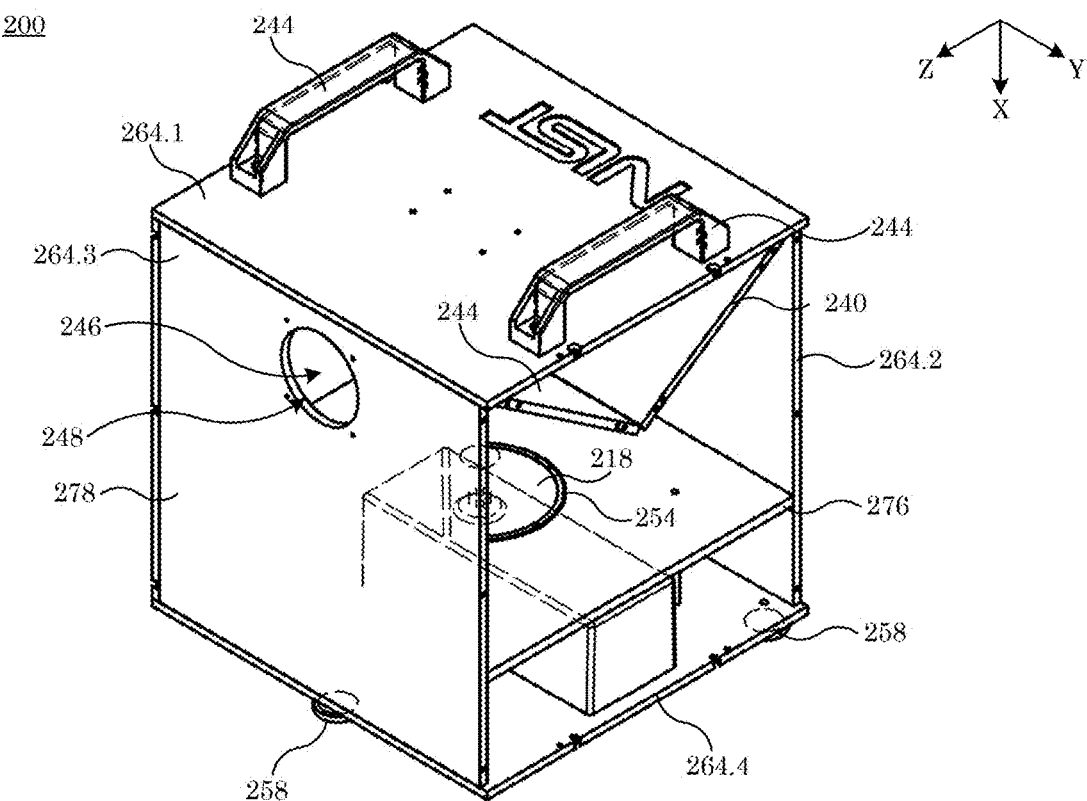
FIG. 4 shows, in panel A, a perspective view of the non-attenuating meter shown in FIG. 1 and the same view in panel B with certain internal components rendered.
Figure 4:
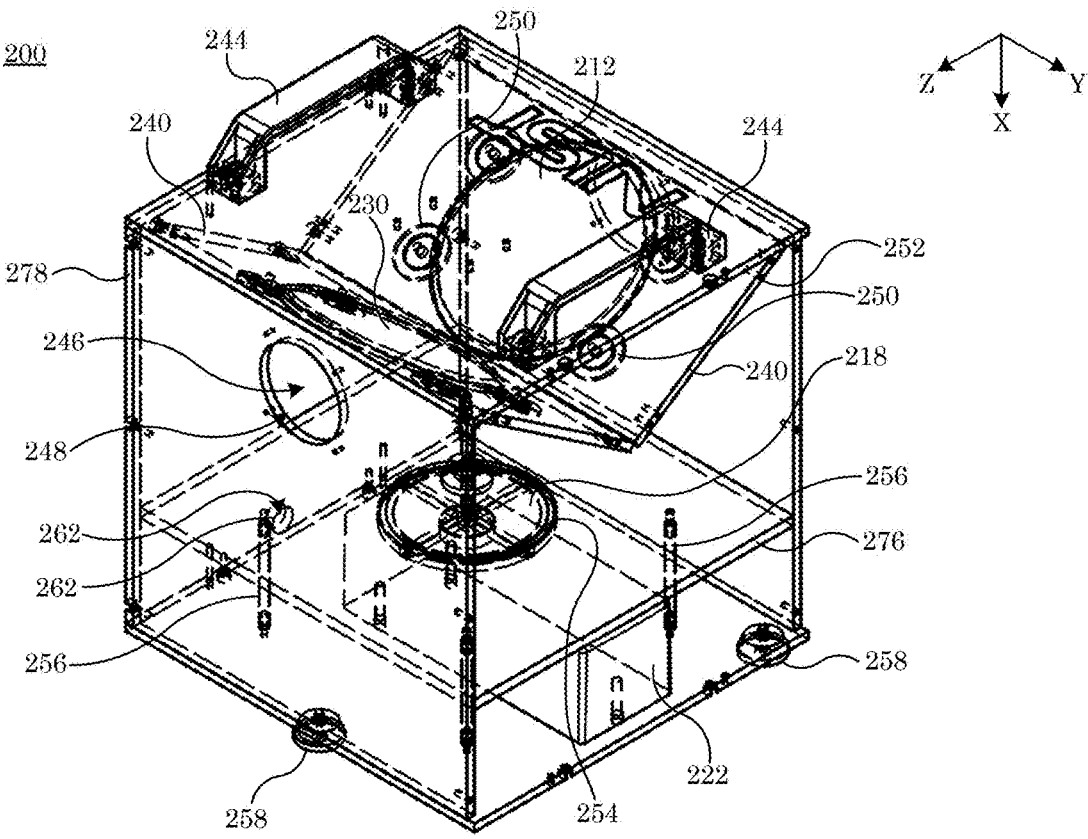
Figure 6:
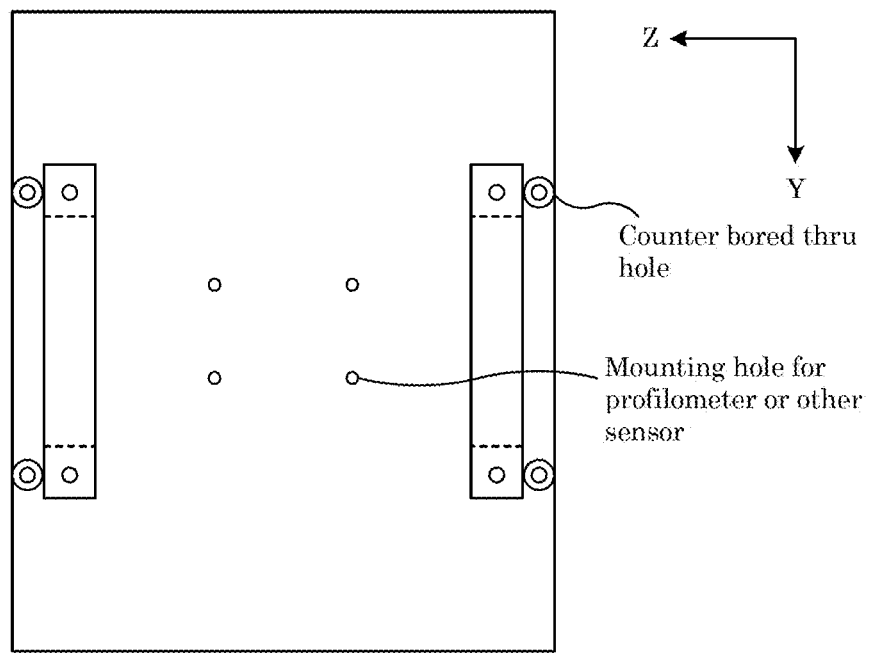
FIG. 6 shows a top housing panel in panels A and B.
Figure 6:
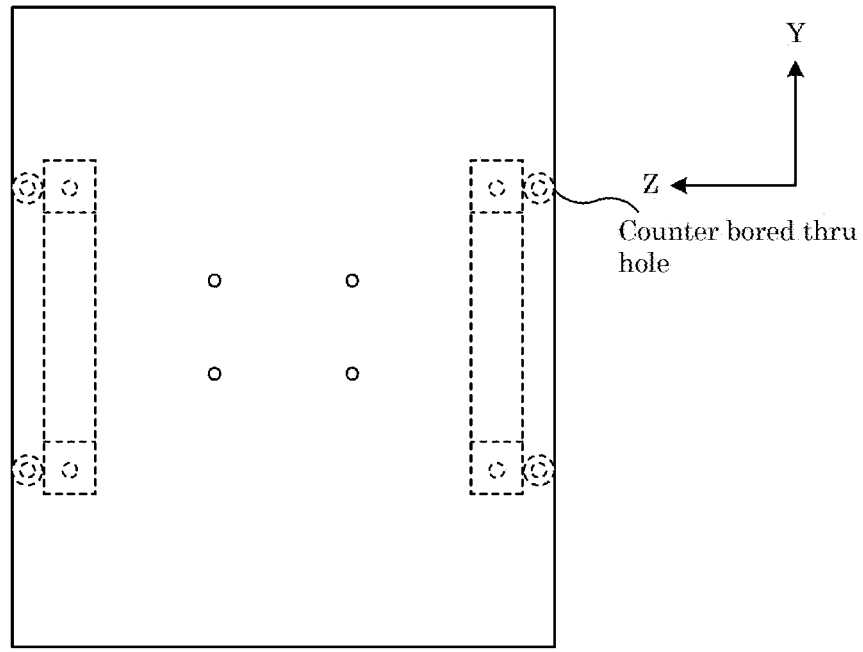

With reference to FIG. 3 and FIG. 6, top housing panel 264.1 can include handle 244 that provides portability to non-attenuating meter 200 and can include locating pins, holes to accommodate mechanical fasteners or to attach beam profilometry components or elements or to attach and relate a location of side panels (264.3, 264.6, 264.2, 264.5). Top housing panel 264.1 can be a rigid material such a metal alloy. Exemplary top housing panel 264.1 aluminum plate that has a selected thickness, e.g., 7 mm thick.

Figure 7:
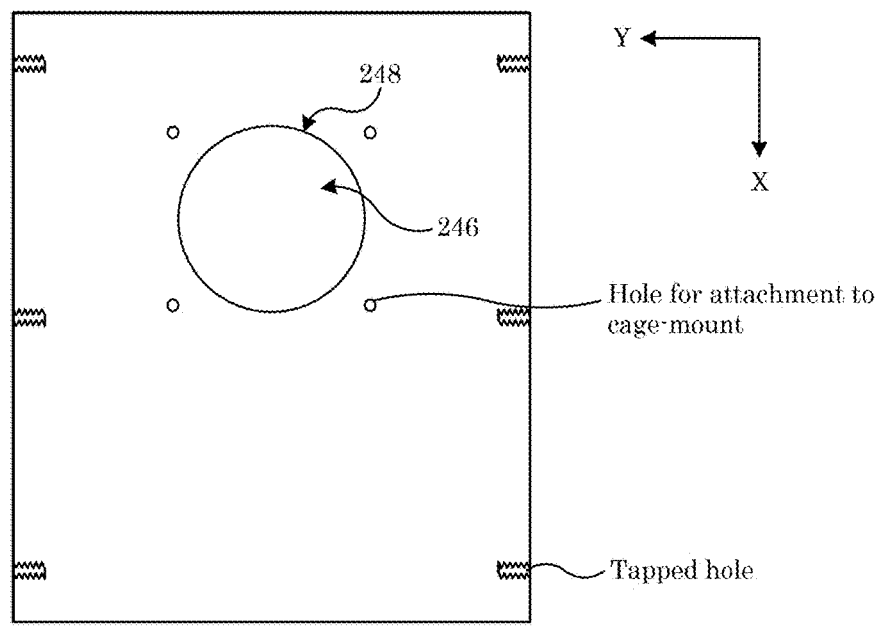
FIG. 7 shows an entry or exit housing panel in panels A and B.
Figure 7:
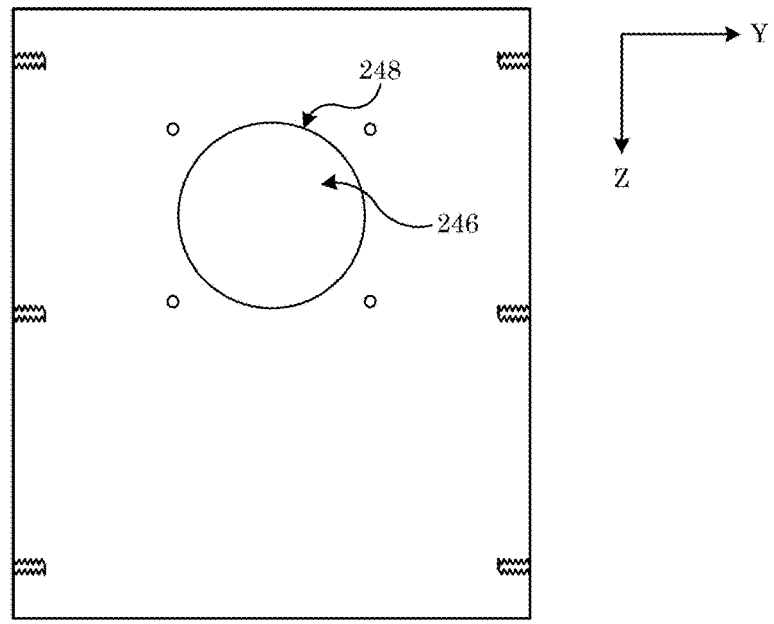

With reference to FIG. 7, side housing panels (264.2, 264.3) can include a through hole, threaded holes to attach a laser collimator or other optical component, attach and relate the location of top and bottom panels and side panels 264.1, 264.4 264.3, 264.2, and can be rigid machinable material such as a metal. Exemplary side housing panels (264.2, 264.3) include aluminum plate that has a selected thickness, e.g., 7 mm thick. In an embodiment, light entry housing panel 264.2 includes aperture 246 bounded by wall 248 and that receives and communicates laser light 210 to recipient mirror 212. Light exit housing panel 264.3 includes second aperture 246 bounded by second wall 248 and that receives and communicates pass light 242 from passer mirror 230.

Figure 8:
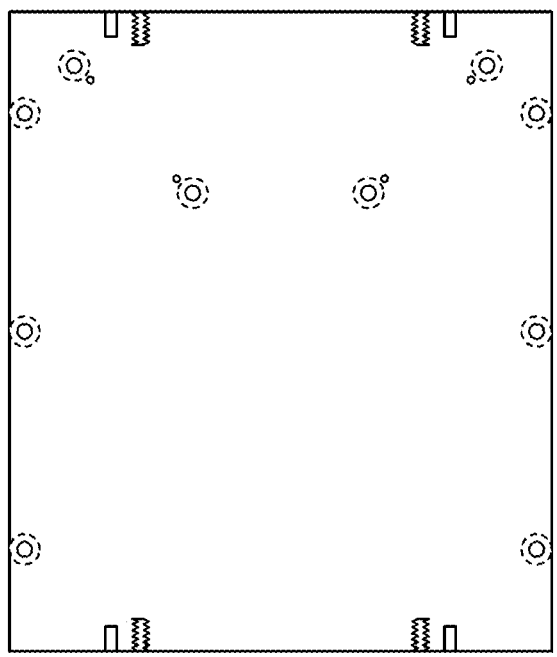
FIG. 8 shows a front housing panel in panels A and B.
Figure 8:
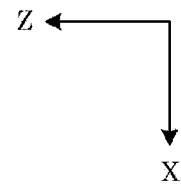
Figure 8:
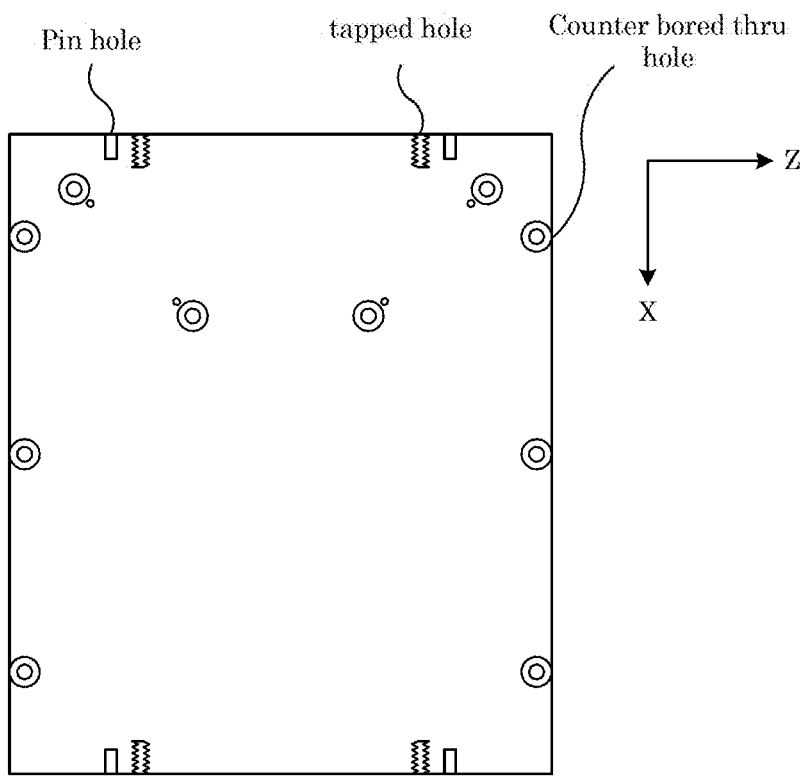
Figure 8:
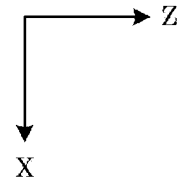

With reference to FIG. 8, front housing panel 264.6 can include holes, threaded holes, counterbored clear holes, and the like to spatially relate and align and attach side panels (264.2, 264.3), top and bottom panels (264.1, 264.4), and mounting plates (240.1, 240.2) and can be a rigid machinable material such as metal. Exemplary front housing panel 264.6 includes aluminum plate approximately 7 mm thick.

Figure 9:
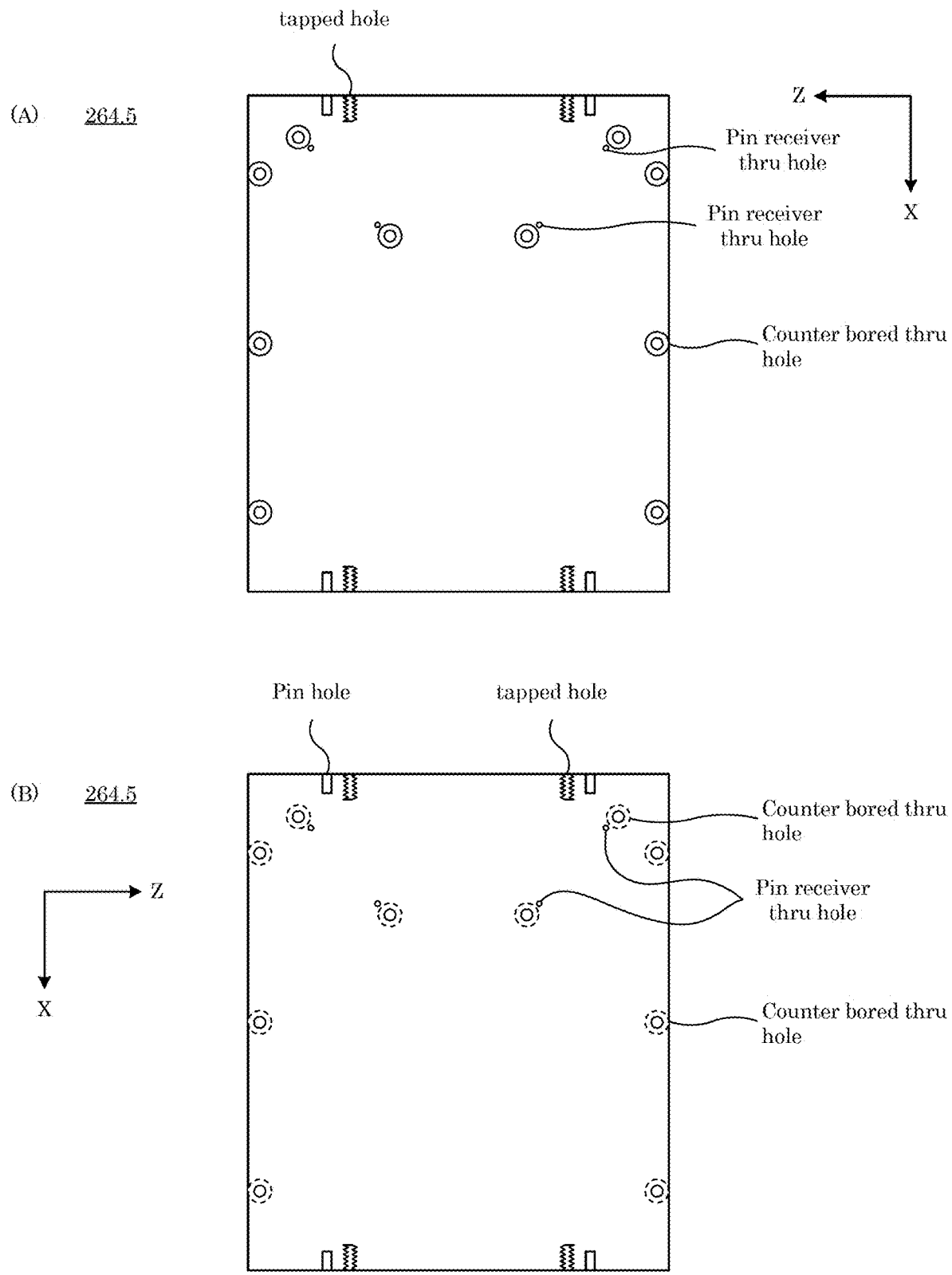
FIG. 9 shows a back housing panel in panels A and B.

With reference to FIG. 9, back housing panel 264.5 can include holes, threaded holes, counterbored clear holes, and the like to spatially relate and align and attach side panels (264.2, 264.3), top and bottom panels (264.1, 264.4), and mounting plates (240.1, 240.2). Pins can be inserted or located on various portions of back housing panel 264.5 for alignment of hardware components. Metal or other rigid machinable material can be used. Parts can be removable to provide access to force sensor 222. Exemplary back housing panel 264.5 includes aluminum plate approximately 7 mm thick. In an embodiment, back housing panel 264.5 includes through hole 260, wall 262 to permit through-access to electrical power wiring or other communication wiring for force sensor 222.

Figure 10:
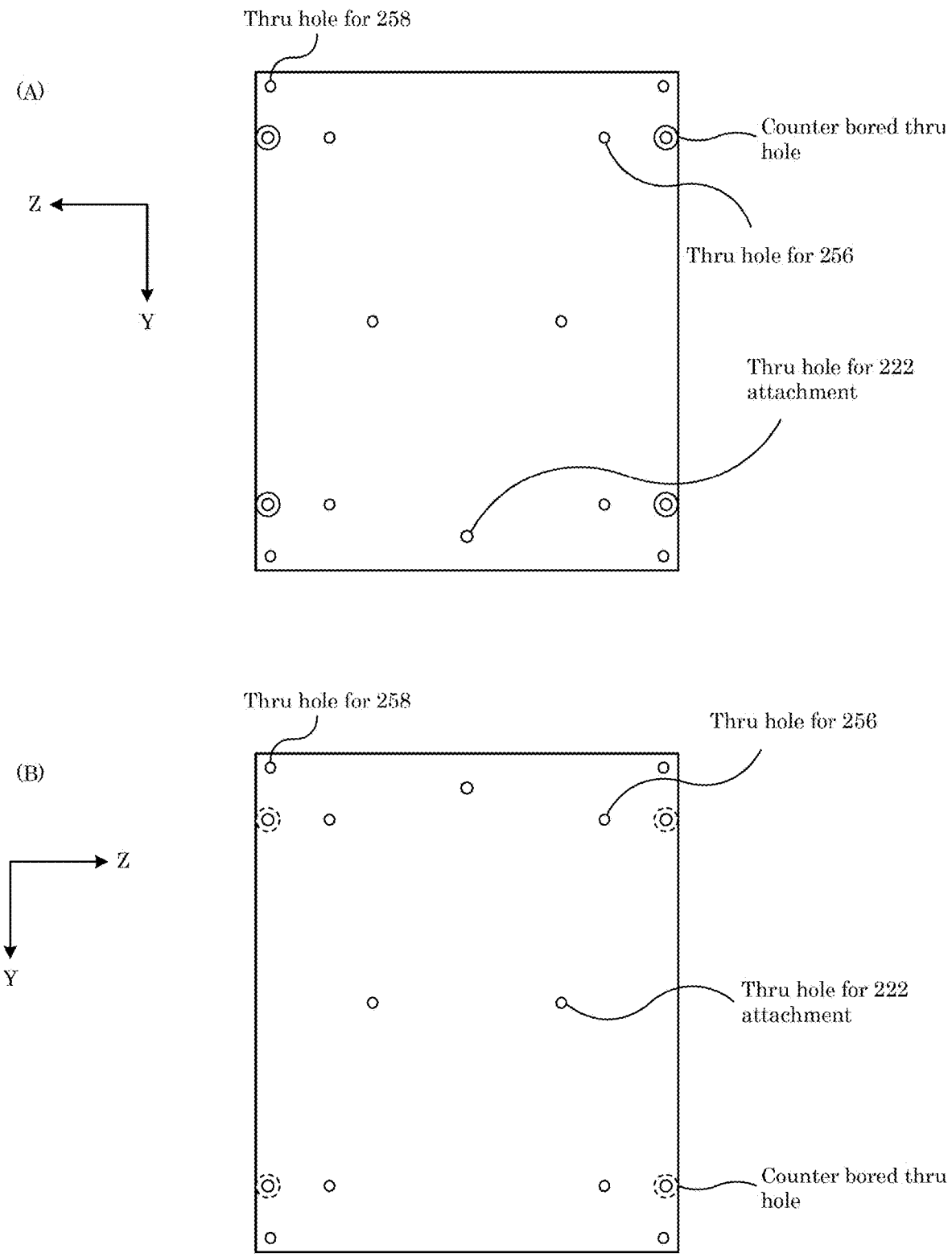
FIG. 10 shows a bottom housing panel in panels A and B.

With reference to FIG. 10, bottom housing panel 264.4 can include holes, threaded holes, counterbored clear holes, and the like to spatially relate and align and attach side panels (264.2, 264.3, 264.6, 264.5), foot 258, sensor 222, and support member 256. Exemplary bottom housing panel 264.4 includes aluminum plate approximately 7 mm thick. In an embodiment, bottom housing panel 264.4 includes foot 258 that is a point of rest for bottom housing and attachment to a reference plane such as a table top.

Figure 11:
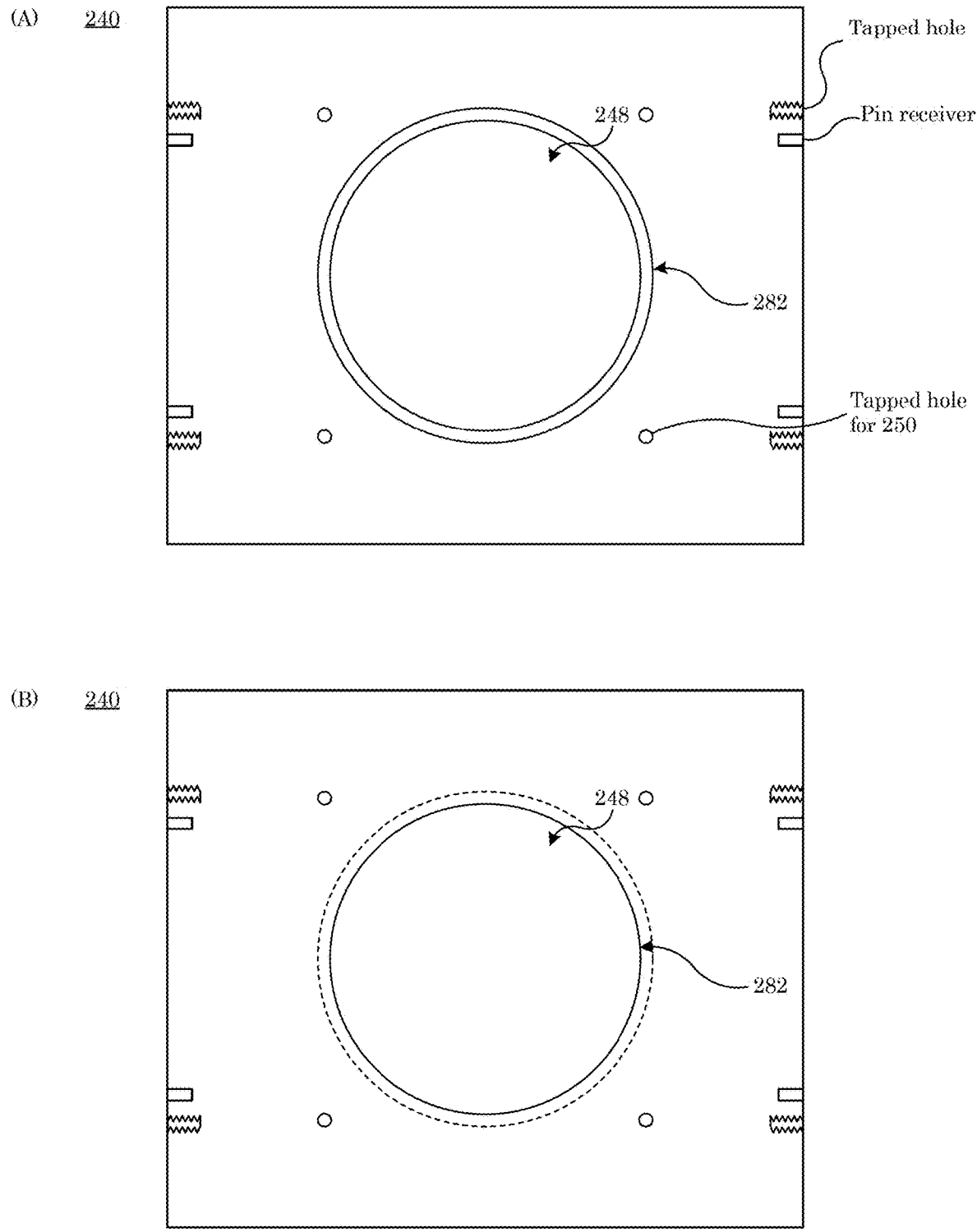
FIG. 11 shows a mounting plate.

With reference to FIG. 11, mounting plate 240 can include mirror aperture 280, aperture wall 282, retainer 250 that clamps mirrors to mounting plate 240, pin receiver 252, pins received by pin receiver 252, and threaded fastener holes. Recipient mirror 212 and passer mirror 230 are independently disposed on mounting plates 240. It is contemplated that mirrors disposed on mounting plate 240 can rest on a shoulder inset of mounting plate 240. With reference to FIG. 11, mounting plate 240 can include pins for receiver 252, metal disks, threaded fasteners to locate and retain recipient mirror 212 or to locate and attach front and back housing panel (264.5, 264.6). Mounting plate 240 can be a plate such as a metal plate. In an embodiment, mounting plate 240 includes machined aluminum plate with 25 mm diameter stainless steel retainer 250, 3 mm pin and receiver 252.

Figure 12:
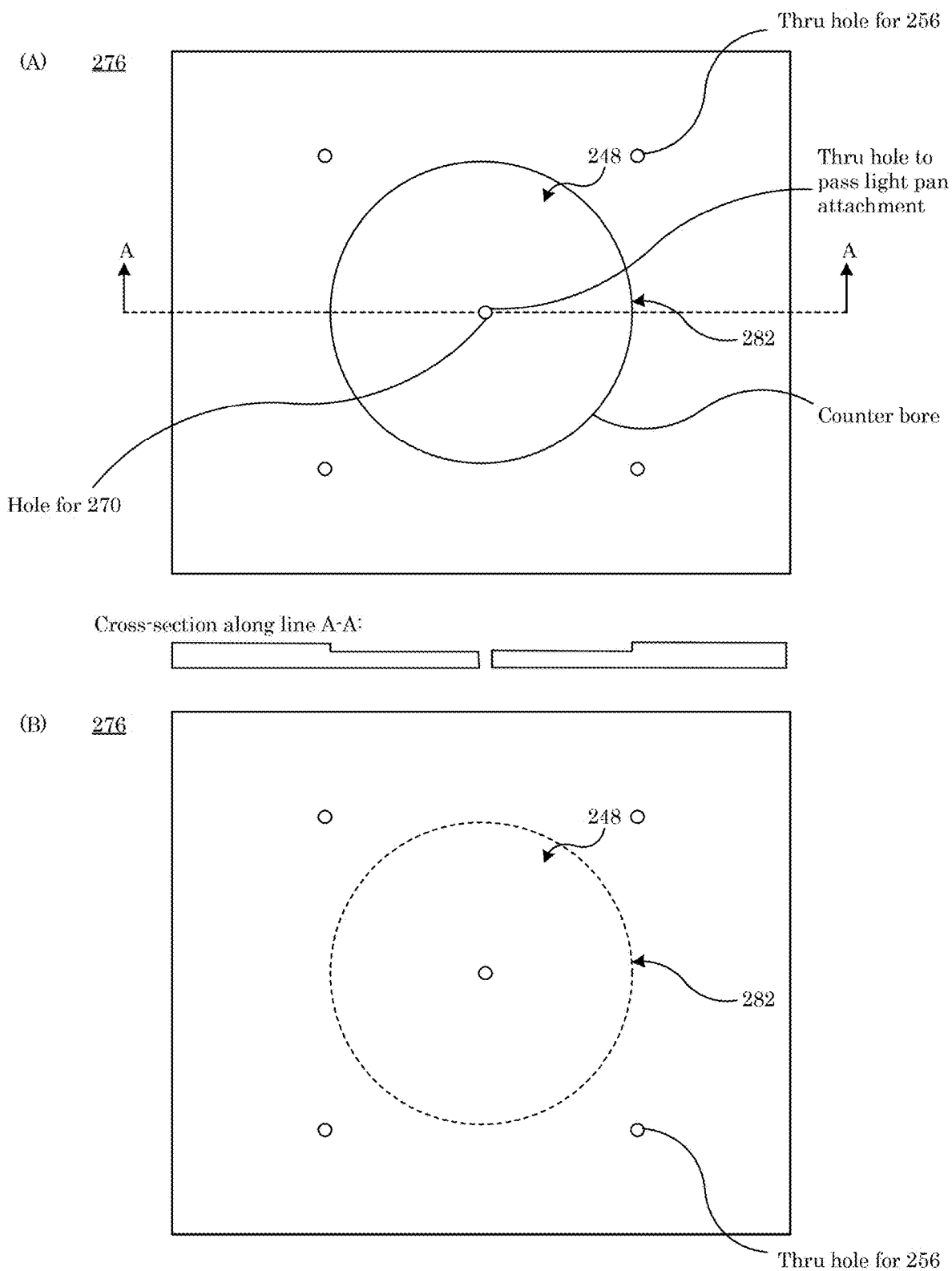
FIG. 12 shows a mirror panel.

With reference to FIG. 12, floor 276 can include mirror aperture 280, aperture wall 282, mirror mount 254, support member 256, and clearance hole for 270. Sensor mirror 218 is disposed on mirror panel 276. Floor 276 can include a counterbore to provide reduction of air circulation beneath the sensor mirror 218 and thermal isolation of force sensor 222 and can be aluminum plate. Exemplary mirror panel 276 includes 7 mm thick plate.

Figure 14:
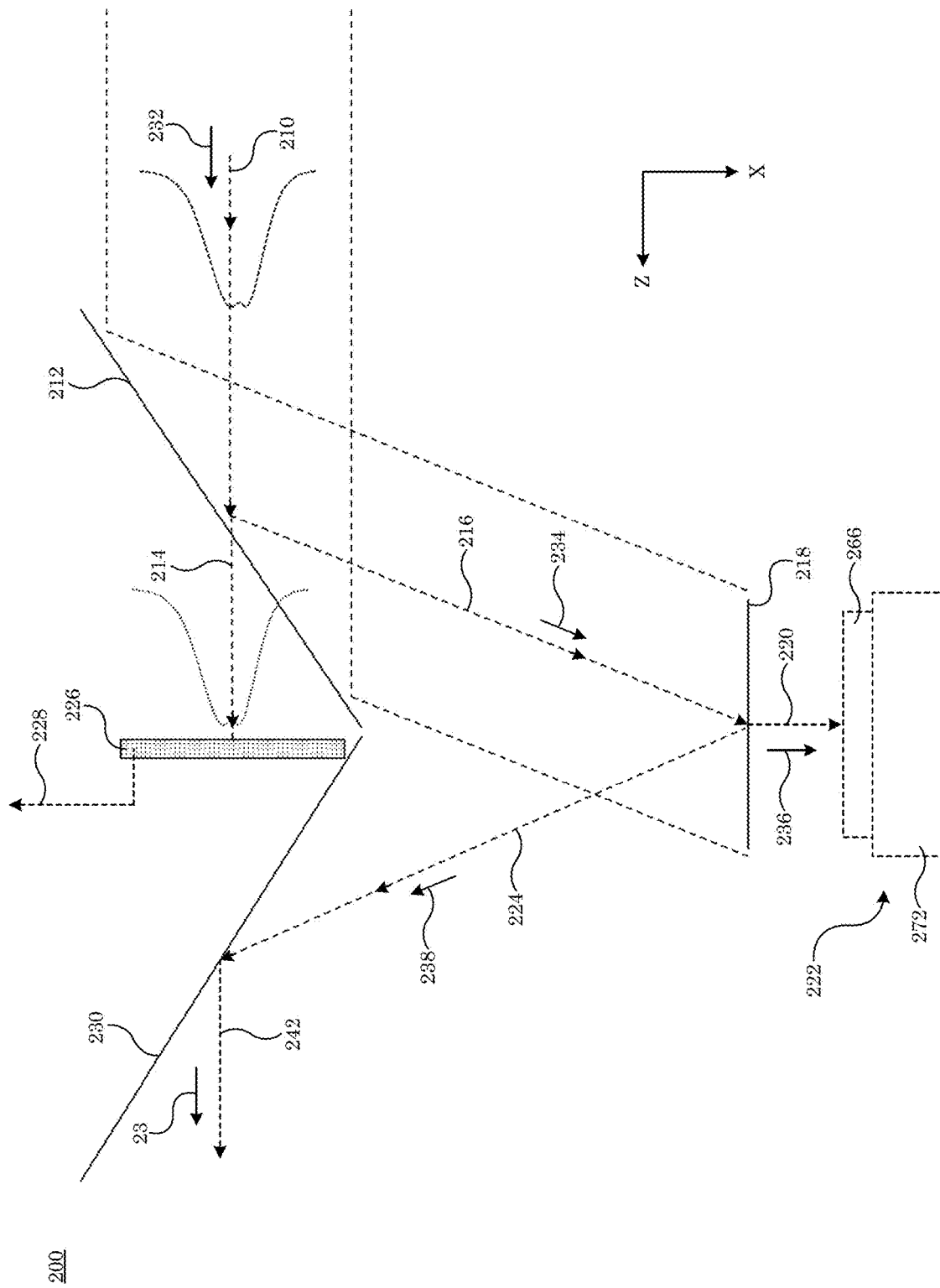
FIG. 14 shows a propagation directions of light in a non-attenuating meter.
Figure 15:
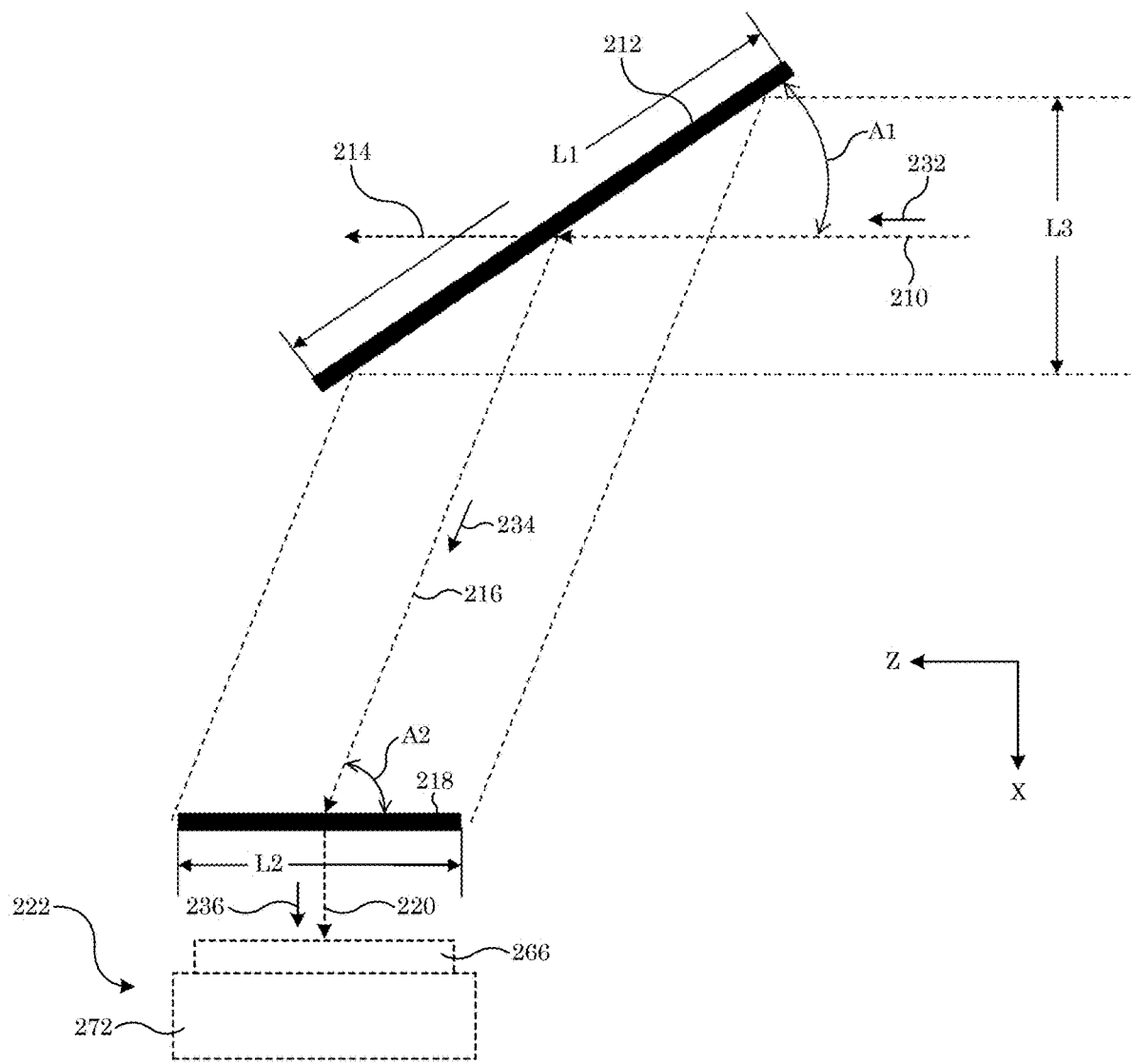
FIG. 15 shows a propagation directions of light in a non-attenuating meter.

Light (214, 216, 224, 242) and sensor force 220 propagate in various directions that can include primary propagation direction 232, secondary propagation direction 234, tertiary direction 236, and tertiary propagation direction 238. Moreover, light pan 266 moves along reciprocation direction 268. With reference to FIG. 13, FIG. 14, and FIG. 15, laser light 210 propagates along primary propagation direction 232, and profile light 214, and pass light 242 similarly propagate along primary propagation direction 232. recipient mirror 212 is disposed at first angle A1 with respect to primary propagation direction 232. First angle A1 can be from be from 0° to 90°, specifically from 22° to 67°, and more specifically from 33.9° to 34.1°. First reflected light 216 propagates along secondary propagation direction 234 as reflected from recipient mirror 212 and is received by sensor mirror 218 at second angle A2. Second angle A2 can be from be from 0° to 90°, and specifically from at an incidence of 68° but can depend on a specification of first angle A1.

A photodiode having a fast temporal response (nanoseconds or faster) in addition to or in lieu of the profilometer may be employed to compensate for averaging time or other delay introduced by the inherent response of the force sensor. The information from the photodiode in combination with power from the force sensor can be employed to attain laser pulse energy, pulse duration, pulse repetition frequency, and peak power of pulsed or otherwise not continuous wave (CW) laser.

The process for making non-attenuating meter 200 includes arranging three mirrors such that the incoming light is coaxial to out-going light and also so that the light reflects from an intermediate mirror coupled to a force sensor. Selection of the force sensor and sensor mass capacity accommodate a mass of the sensor mirror. Size L1 of the recipient mirror and sensor mirror L2 are provided by aperture 246 opening dimension L3, wherein L1 is greater than or equal to L3/sin(A1). Force sensor 222 is disposed in the path of first reflected light 216 such that 216 intersects a geometric center of the reflective plane of the sensor mirror 218. The force sensor is located and mounted rigidly to bottom plate 264.4 based on the relationship between aperture 246 and 218. In addition, the beam path is symmetric about the geometric center line (x-axis) in the x-z plane (in the midpoint of the z-y plane). The recipient mirror 212 is mounted rigidly, and the angle is fixed with respect to front housing panel (264.4, 264.5) by recipient pin (holes and pins) in mirror mount 254. The recipient mirror 218 is restrained by retainer 250. Access to the communication and electrical power from the force sensor 222 is gained by connection through hole 260 and wall 262.

Non-attenuating meter 200 can be made in various ways. In an embodiment, a process for making non-attenuating meter 200 includes making mounting plates (240.1, 240.2) by disposing a hole and a resting surface in the plane for recipient mirror 212 and an identical plate for passer mirror 230. Mounting plates (240.1, 240.2) are disposed with respect to the plane of the aperture and the center of aperture 246 by a pin receiver perpendicular to the plane of mounting plates (264.5, 264.5); disposing recipient mirror 212 on mounting plate 240.1 by retainer 250; disposing passer mirror 230 on mounting plate 240.2 by retainer 250; making mirror panel 276 by attachment to floor panel 264.4 with support member 256; disposing sensor mirror 218 so that sensor mirror 218 is surrounded by but not in direct contact with mirror panel 276; and supporting sensor mirror 218 on light pan 266 and force transfer member 270.

In an embodiment, a process for determining optical power includes communicating laser light onto sensor mirror 218 and observing the force imparted on light pan 266 and force sensor 222. The electrical signal proportional to force imparted on the sensor mirror is quantified by a mass known by means of operation of force sensor 222, which in a presence of a gravitational field is equal to the light force divided by the local gravitational constant (~9.8 m/s$^2$).

Non-attenuating meter 200 has numerous advantageous and unexpected benefits and uses. In an embodiment, a process for determining optical energy of laser light 210 with non-attenuating meter 200 in an absence of optical attenuation of laser light 210 by non-attenuating meter 200 includes propagating laser light 210 along primary propagation direction 232; receiving laser light 210 by recipient mirror 212 along primary propagation direction 232; producing, by recipient mirror 212, first reflected light 216 from laser light 210; communicating first reflected light 216 from recipient mirror 212 along secondary propagation direction 234; receiving, by sensor mirror 218, first reflected light 216 from recipient mirror 212; producing, by sensor mirror 218, sensor force 220 and second reflected light 224; communicating, from sensor mirror 218, sensor force 220 along tertiary direction 236; receiving, by force sensor 222, sensor force 220 from sensor mirror 218; communicating, from sensor mirror 218, second reflected light 224 along tertiary propagation direction 238; receiving, by passer mirror 230, second reflected light 224 from sensor mirror 218; producing, by passer mirror 230 passer mirror 230, pass light 242; communicating, from passer mirror 230, pass light 242 pass light 242 along primary propagation direction 232; and producing, from sensor force 220, force signal 274 to determining the optical energy of laser light 210. The process can include, producing, by recipient mirror 212, profile light 214 from laser light 210; communicating profile light 214 through recipient mirror 212; receiving, by profilometer 226, profile light 214; and producing, by profilometer 226, profile signal 228 from profile light 214.

In the process for determining optical energy, producing, from sensor force 220, force signal 274 includes alignment of aperture 246 normal and centered with respect to laser light 210, laser light 210 passing through aperture 246. In the process for determining optical energy, producing, by profilometer 226 (e.g., a fast sampling photodiode for measuring power with respect to time), profile signal 228 includes alignment of aperture 246 normal and centered with respect to laser light 210, laser light 210 passing through aperture 246. The process for determining optical energy also can include measuring the power of light 210 with respect to time with a temporal resolution being that of profilometer 226.

Producing, from the sensor force 220, the force signal 274 can include: displacing a light pan of the force sensor from a rest position in an absence to a displaced position in presence of the sensor force; imparting a quantity of current to an electromagnet of the force sensor; subjecting a restoring force to the light pan from the electromagnet, a magnitude of the restoring force being based on the quantity of the current imparted to the electromagnet; restoring, by the restoring force, the light pan from the displaced position to the rest position in response to being subjected to the restoring force; and determining a force of first reflected light from the quantity of current imparted to the electromagnet to move the light pan to the rest position from the displaced position, wherein the quantity of current is proportional to the force of first reflected light received by the recipient mirror.

Producing, by the profilometer 226, the profile signal 228 can include: producing, by a plurality of photodetectors, an electrical response in response to receipt of the profile light 214 by the profilometer, the electrical response comprising a current, a voltage, or a combination thereof; and correlating each photodetector to a position in profilometer 226 in a plane perpendicular to the propagation of the profile light 214, wherein the electrical response produced by each photodetector is proportional to optical power of the profile light received by each photodetector.

Non-attenuating meter 200 and processes disclosed herein have numerous beneficial uses, including measurement of optical power while simultaneously operating the laser for its selected application without terminating the application such as determining the power on a secondary power meter, laser-based manufacturing such as cutting, welding, annealing, additive metal deposition, and the like. By selecting a mirror with respect to a wavelength and reflectance, meter 200 can measure a broad spectrum of energy at various wavelengths from X-ray or neutrons to far infrared radiation. Advantageously, non-attenuating meter 200 overcomes limitations of technical deficiencies of conventional articles such as conventional power meters for measurement of laser power that exclusively absorb the power that is being measured rather than communicating most of the laser to the application for which the laser is being used. Further, for very high power of the laser light, operation of meter 200 can be continuous rather than in shorter duration doses that would alter or melt a thermal (absorption)-based meter.

Non-attenuating meter 200 and processes herein unexpectedly provide access to a small amount of the light transmitted by recipient mirror for beam profile measurements, temporal measurements, laser pulse energy. Moreover, non-attenuating meter 200 measures laser beam irradiance as a function of time for multikilowatt laser sources without substantially altering the nature of the laser light 210 and permitting the laser light to be located for its intended purpose such as manufacturing, metrology, ablation, or other laser-material interactions.

The articles and processes herein are illustrated further by the following Example, which is non-limiting.

EXAMPLE

Inline Laser Power Measurement by Photon Momentum.

A non-attenuating meter measures and quantifies laser power by photon momentum. In the non-attenuating meter, an incoming laser beam is minimally perturbed and available for a secondary purpose other than power measurement along the incoming beam axis. Additionally, a geometry of the non-attenuating meter provides access to a transmittance between two passive mirrors that face a force sensor. The force sensor is can be a commercially available weighing instrument that can be referred to as scale that has a temporal response of approximately 5 s and a readability of approximately 1 µg (~2 W). Measurement results include beam profile and power for 500 W. Optics include mirrors for an angle of incidence and selected reflectance, e.g., at a wavelength of laser light that can be, e.g., 1070 nm. A size of the non-attenuating meter can include an input aperture of inner diameter that can be based on beam path or geometry of the non-attenuating meter and can be, e.g., 75 mm.

The force sensor can include weighing instrument, also referred to as a scale, that can have, e.g., a temporal response of approximately 5 sec and a readability of approximately 1 µg (~2 W). Measurement results demonstrate beam profile and power for 500 W, but the mirror and mass (or force) calibration are suitable for very high power up to 50 kW and beyond. The optics include mirrors optimized for the angle of incidence and maximum reflectance at the wavelength of 1070 nm. The instrument has an input aperture of 075 mm. To demonstrate attic accessibility to the profilometer, the housing geometry is placed in-line with an ytterbium-doped fiber laser providing 1070 nm wavelength collimated light at a nominal beam size of 07 mm and power level of 500 W. A diode-based beam profile monitor is disposed at the location of profilometer 226. Recipient mirror 212 and passer mirror 230 have nearly 0.99999 reflectance and are also therefore functionally a 100,000:1 beam splitter. This permits a small amount of light transmitted by mirror 212 to be received by profilometer 226.

Certain conventional calibrated weighing instruments operate with a vertically-directed force that is parallel to a force of gravity. The non-attenuating meter includes a force sensor disposed in a vertical-force orientation along a tertiary direction to measure radiation pressure from a horizontally propagating laser light beam without perturbing a propagation direction of the incoming laser light. Regarding alignment, the laser light can be aligned for its intended application followed by disposing the non-attenuating meter along the primary propagation direction of the laser light followed by measuring power of the laser light by the non-attenuating meter along the primary propagation direction.

Photon momentum is a non-destructive means of measuring optical power. A measurement of laser power by photon momentum relies on a relationship between force F and power P, wherein $F=[(1+r)P/c]\cos\theta F=[(1+r)P/c]\cos\theta$, wherein r is the mirror reflectance; c is the speed of light, and θ is the angle of incidence of light. The non-attenuating meter includes three mirrors that have a reflectance near 0.99999 to provide a radiation-pressure measurement of the optical power of a horizontally directed laser beam propagating along primary propagation direction using the non-attenuating meter to measure a vertical force, i.e., the sensor force along a tertiary direction. This non-perturbing geometry uses recipient mirror 212 and passer mirror 230 as input and output turning mirrors to direct the horizontally propagating input laser onto a horizontally oriented sensor mirror atop the force sensor and then to redirect the pass light 242 as a reflected beam to be collinear with the input, unperturbed laser beam. Also, a vacant V-shaped volume between the turning mirrors, referred to here as an attic, provides integration of a laser measurement device, e.g., a profilometer, to characterize the laser light by parasitically measuring a negligible power leakage through the recipient mirror. The in-situ arrangement is desirable for calibrating a detector or altering a target, e.g., laser welding, cutting, and the like.

Figure 5:
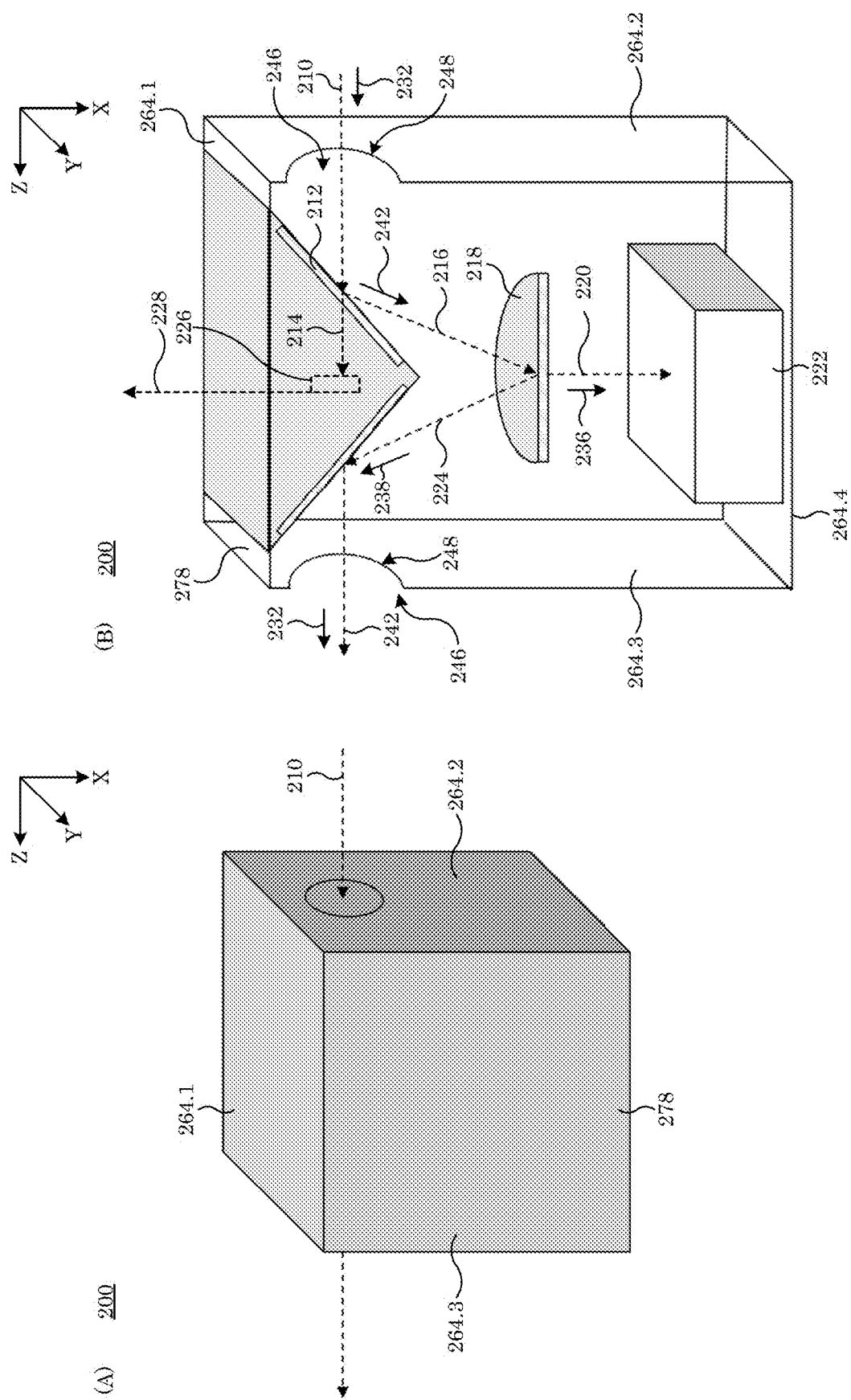
FIG. 5 shows a solid perspective view of a non-attenuating meter in panel A and a cutaway perspective view in panel B.

An optical design of the non-attenuating meter includes a beam path that has three reflections in a V pattern as shown in FIG. 5. The optical design can include a 75 mm-diameter input laser light and a cubic geometry for the non-attenuating meter. The mirrors can be fused silica. It is contemplated that the mirrors can be 3-mm thick fused silica as 150 mm-diameter discs. The mirrors can be different sizes such as two large mirrors and one smaller mirror. The two larger mirrors are passive with respect to the laser light and reflections thereof so that mirrors merely redirect the laser light by reflection to and from the active sensor mirror disposed on the force sensor. In this mirror arrangement, an angle of incidence on the first mirror can be 56° to for a select size of the non-attenuating meter for a laser light size that can be accommodated by entry and exit apertures that are, e.g., 75 mm in diameter. A larger angle of incidence can be included with a high-reflectance coating for 1070 nm wavelength at larger angles of incidence near Brewster's angle.

Here, the force sensor was a scale with a pan (mirror) capacity of 5.1 g that provided a level of sensitivity of 1 µg and a response time of approximately 5 s. The force sensor was disposed in the non-attenuating meter and isolated from external air movement and acoustic noise.

A mirror coating included an ion beam sputtered multi-layer that included alternating quarter-wave-thick layers of high- and low-index oxides designed for reflecting 1070 nm (ytterbium fiber laser) light. The reflectivity was selected to be 99.998% for s-polarized light and 99.995% for p-polarized light. The substrate was transparent to 1070 nm so the actual mirror reflectance by transmittance measurements was 0.99997±0.00006. The coatings had a laser-induced damage threshold of greater than 1 MW/cm$^2$ and absorption of less than 1 ppm at this wavelength.

The uncertainty budget for the non-attenuating meter is listed in the Table, wherein terms are relative with the exception of $\sigma_p$.

TABLE

| Description | Variable | Type A | Type B |
|---|---|---|---|
| Mirror reflectivity | $U_{mirror}$ | | 0.001 |
| Scale calibration | $U_{scale}$ | | 0.008 |
| Angle of incidence | $U_{angle}$ | | 0.001 |
| Vibrational noise | $\sigma_p$ | 8.33 W | |
| Drift nonlinearity | $\gamma_\tau$ | | 0.001 |

The uncertainty of the force calibration is taken from a curve fit to the mass calibration factor of the scale at a mass value equivalent to 500 W of incident laser power. The Type A statistical uncertainty for the non-attenuating meter was dependent upon the acoustic (vibrational) noise background and was 8.33 W.

The total uncertainty is described by Eq. (1), wherein P is the averaged laser power, and n is the number of samples averaged in the time interval $\Delta t$. A 20 s measurement at 500 W has an uncertainty of 0.022.

$$2U(P, \Delta t) = 2\sqrt{u_{scale}^2 + u_{mirror}^2 + u_{angle}^2 + \left(\frac{\sigma_p}{P}\sqrt{\frac{n}{\Delta t}}\right)^2 + \gamma_T^2}.$$

Regarding attic accessibility, the non-attenuating meter was disposed in line with an ytterbium-doped fiber laser providing 1070 nm wavelength collimated light at a nominal beam diameter of 7 mm and power level of 500 W. A diode-based beam profile monitor was placed in the attic. The passive mirrors have nearly 0.99999 reflectance and are functionally a 100,000:1 beam splitter. This provided the small amount of light transmitted by the passive mirrors to be captured by the beam profiler While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A non-attenuating meter for determining optical energy of laser light in an absence of optical attenuation of the laser light by the non-attenuating meter, the non-attenuating meter comprising:
  a recipient mirror that:
    receives the laser light that is propagating in a primary propagation direction;
    produces profile light from the laser light;
    transmits the profile light through the recipient mirror along the primary propagation direction;
    produces first reflected light from the laser light; and
    reflects the first reflected light along a secondary propagation direction;
  a profilometer in optical communication with the recipient mirror and that:
    receives the profile light from the recipient mirror along the primary propagation direction; and produces a profile signal from the profile light; and a sensor mirror in optical communication with the recipient mirror and a passer mirror and that:
receives the first reflected light from the recipient mirror along the secondary propagation direction;
produces, in a tertiary direction, a sensor force from the first reflected light;
communicates the sensor force to a force sensor along the tertiary direction;
produces a second reflected light from the first reflected light; and
reflects the second reflected light in a tertiary propagation direction;
the passer mirror in optical communication with the sensor mirror and that:
receives, along the tertiary propagation direction, the second reflected light from the sensor mirror;
produces pass light from the second reflected light; and
reflects the pass light along the primary propagation direction,
such that the non-attenuating meter does not attenuate the optical energy of the laser light and does not change the primary propagation direction of the laser light.

2. The non-attenuating meter of claim 1, further comprising the force sensor in optical communication with the sensor mirror and that:
receives the sensor force from the sensor mirror; and
determines the optical energy from the sensor force.

3. The non-attenuating meter of claim 2, wherein the force sensor comprises:
a light pan in optical communication with the sensor mirror and that receives the sensor force from the sensor mirror;
a force transfer member in mechanical communication with the light pan; and
a force electronics in electrical communication with the force transfer member and that produces a force signal based on the sensor force that moves the light pan along a reciprocation direction.

4. The non-attenuating meter of claim 1, further comprising a mounting plate upon which the recipient mirror is disposed.

5. The non-attenuating meter of claim 1, further comprising a mounting plate upon which the passer mirror is disposed.

6. The non-attenuating meter of claim 1, further comprising a mirror panel upon which the sensor mirror is disposed.

7. The non-attenuating meter of claim 1, further comprising a housing in which the recipient mirror, the sensor mirror, and the passer mirror are disposed.

8. The non-attenuating meter of claim 7, wherein the housing comprises:
a bottom housing panel;
a light entry housing panel disposed on the bottom housing panel, the light entry housing panel comprising an aperture bounded by a wall and that receives and communicates the laser light to the recipient mirror; and
a light exit housing panel disposed on the bottom housing panel, the light exit housing panel comprising a second aperture bounded by a second wall and that receives and communicates the pass light from the passer mirror.

9. A process for determining optical energy of laser light with a non-attenuating meter in an absence of optical attenuation of the laser light by the non-attenuating meter, the process comprising:
propagating a laser light along a primary propagation direction;
receiving the laser light by a recipient mirror along the primary propagation direction;
producing, by the recipient mirror, a first reflected light from the laser light;
communicating the first reflected light from the recipient mirror along a secondary propagation direction;
receiving, by a sensor mirror, the first reflected light from the recipient mirror;
producing, by the sensor mirror, a sensor force and a second reflected light;
communicating, from the sensor mirror, the sensor force along a tertiary direction;
receiving, by a force sensor, the sensor force from the sensor mirror;
communicating, from the sensor mirror, the second reflected light along a tertiary propagation direction;
receiving, by a passer mirror, the second reflected light from the sensor mirror;
producing, by the passer mirror, a pass light;
communicating, from the passer mirror, the pass light along the primary propagation direction; and
producing, from the sensor force, a force signal to determining the optical energy of the laser light.

10. The process of claim 9, further comprising:
producing, by the recipient mirror, a profile light from the laser light;
communicating the profile light through the recipient mirror;
receiving, by a profilometer, the profile light; and
producing, by the profilometer, a profile signal from the profile light.

11. The process of claim 9, wherein producing, from the sensor force, the force signal comprises:
displacing a light pan of the force sensor from a rest position in an absence to a displaced position in presence of the sensor force;
imparting a quantity of current to an electromagnet of the force sensor;
subjecting a restoring force to the light pan from the electromagnet, a magnitude of the restoring force being based on the quantity of the current imparted to the electromagnet;
restoring, by the restoring force, the light pan from the displaced position to the rest position in response to being subjected to the restoring force; and
determining a force of first reflected light from the quantity of current imparted to the electromagnet to move the light pan to the rest position from the displaced position, wherein the quantity of current is proportional to the force of first reflected light received by the recipient mirror.

12. The process of claim 10, wherein producing, by the profilometer, the profile signal comprises:
producing, by a plurality of photodetectors, an electrical response in response to receipt of the profile light by the profilometer, the electrical response comprising a current, a voltage, or a combination thereof; and
correlating each photodetector to a position in profilometer in a plane perpendicular to the propagation of the profile light, wherein the electrical response produced by each photodetector is proportional to optical power of the profile light received by each photodetector.

* * * * *